Nov. 6, 1956  D. W. HAMM  2,769,675

PISTON RING OIL SEALING STRUCTURE

Filed Nov. 26, 1954

INVENTOR.
DOUGLAS W. HAMM
BY
Frank E. Liverance, Jr.
ATTORNEY

United States Patent Office 2,769,675
Patented Nov. 6, 1956

2,769,675

PISTON RING OIL SEALING STRUCTURE

Douglas W. Hamm, Muskegon, Mich., assignor to Muskegon Piston Ring Company, Muskegon, Mich., a corporation of Michigan Application November 26, 1954, Serial No. 471,241

3 Claims. (Cl. 309—44)

The present invention relates to a novel structure of oil salvaging ring of the type which is generally used in the lower ring grooves of pistons of internal combustion engines which drive motor vehicles.

It is a primary object and purpose of the present invention to attain, through a novel piston ring construction, a better and more perfect seal against flow of oil through the piston ring groove and around the piston ring upwardly in a cylinder in which the piston is installed, to prevent loss of lubricating oil from passage upward to above the piston where it is burned in the combustion chamber of the engine causing a smoky exhaust, excess use and the expense of such excess use of lubricating oil, production of carbon and fouling of spark plugs. Severe problems in conjunction with internal combustion engines are met, particularly in certain types of engines, wherein increasing vacuum in the engine manifolds takes place tending to draw the lubricating oil upwardly. The novel structure and principle on which it operates in the present invention has primarily the object of preventing such oil passage and its loss by sealing against passage of lubricating oil through the novel structure of piston ring which I have developed.

Figure 1:
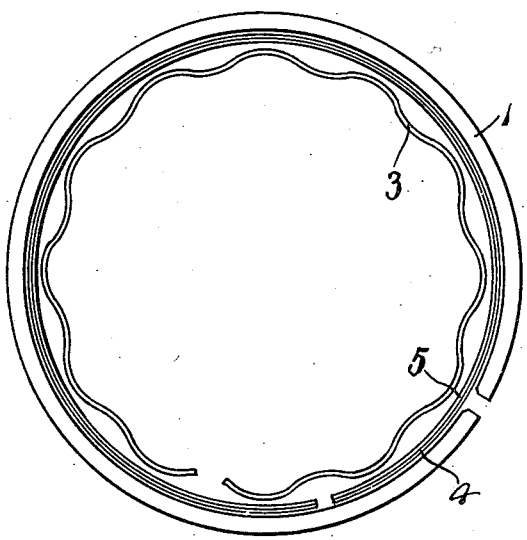

An understanding of the invention may be had from the following description, taken in connection with the accompanying drawing, in which, Fig. 1 is plan view of the piston ring made in accordance with my invention.

Figure 2:
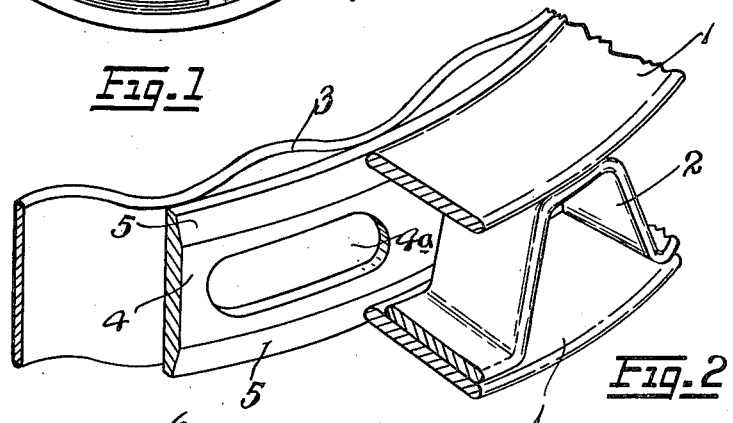
Figure 3:
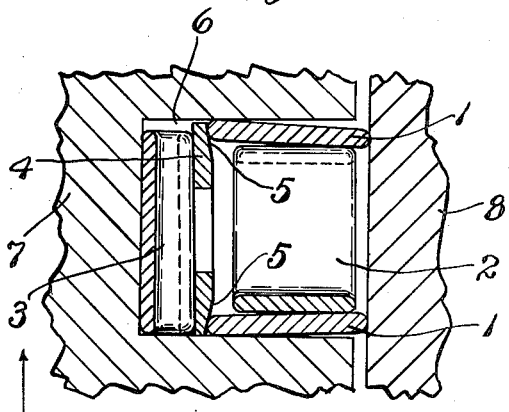

Fig. 2 is a fragmentary perspective view showing the several elements of the piston ring of my invention as they are associated and combined together, and Fig. 3 is a fragmentary vertical section through a piston at the oil groove thereof with a piston ring of my invention installed in such groove, such ring being in transverse section, the piston and the piston ring being inside a cylinder wall.

Like reference characters refer to like parts in the different figures of the drawing.

In the construction of the piston ring, upper and lower thin rails 1 of metal, usually steel, parted at one side for passage over the head of a piston to a ring groove, are supported and held spaced apart by a spacing ring member 2 between them. Such spacer as shown in the drawing is of corrugated form made from flat metal, alternate corrugations being closed at upper and lower ends, against which closed ends the upper and lower rails contact. Such rails may be cemented to the surfaces at the closed ends of the corrugations of the spacer by a cement which is dissolved and disappears when the ring is in service, subjected to lubricating oil at high temperature; though the invention is not limited to the cementing together of the rails and spacers and many different specific spacer structures may be used without affecting the present invention.

Previously in piston rings, back of such rails and spacer a corrugated parted spring expander has been located having alternate outwardly and inwardly extending humps, the outer humps pressing against the inner edges of the rails and the inner humps being forced against the bottom of a piston ring groove in which the ring is installed. Such expander is shown at 3 and may have any of the numerous types of vent openings which are made in such expanders for passage of lubricating oil to the bottom of a piston ring groove. Preferably with my invention the venting openings will be through the expander between upper and lower edges thereof.

With my invention, a circular shim 4 of suitable material which may be metal or any other equivalent thereto in use, is interposed between the expander 3 and the inner edges of the rails 1. Such shim 4 is of a suitable thickness so that it has a considerable measure of rigidity and is of a width less than the width of a ring groove in a piston in which the ring is installed being freely received therein. Such shim with vent openings 4a between its edges, at its outer side and adjacent its opposed upper and lower edge portions is beveled upwardly and inwardly and downwardly and inwardly, respectively, to provide annular surfaces 5 disposed at an acute angle to the vertical, that is, to the plane of the shim width. It is such inclined surfaces at 5 which bear against the inner curved edges of the rails 1.

In Fig. 3, the piston ring of my invention is shown installed in a ring groove 6 in a piston 7 mounted for reciprocation in a cylinder having walls 8. The direction of the bevels or inclined surfaces at 5 is such it creates a wedge action or condition wherein the rails 1 are forced against the sides of the piston ring groove, creating a seal between them and the groove so that lubricating oil is held from flowing around the piston ring between the rails and the sides of the groove to come above the groove. The expander 3 pushes on the shim 4 and the shim in turn pushes outwardly on the rails 1. There are continuous seals between the inner curved edges of the rails 1 and the surfaces 5 on the shim against which they bear.

The angle of the bevel of the surfaces at 5 may be varied to create varying degrees of wedge action of the rails in the piston ring groove. Generally, an angle between five degrees to twenty degrees operates very satisfactorily. The thickness of the shim at 4 also may be varied though always, preferably, a thickness sufficient to give rigidity to the shim is desirable. With such type of shim it acts to smooth out the hump pressures of the expander 3 against it and make the outward pressure upon the rails 1 substantially uniform throughout their length. The shims as said before may be made of metal, or the shim may be rubber or otherwise resiliently coated as an aid in perfection of the seal wanted. The shim, however, is not required to be of metal or have metal parts, as many other materials will serve. It is further evident that the shim may be provided with beveled upper and lower edge surfaces in other and equivalent ways than that specifically described as, for example, by stamping from sheet metal or similar material.

The structure described is readily manufactured and installed and operates in an exceptionally satisfactory manner in all engines and particularly in those in which the manifold vacuum is high and is getting increasingly higher.

The invention is defined in the appended claims and is to be considered comprehensive of all forms of structure coming within their scope.

I claim:

1. A piston ring comprising a circular expander, a circular parted thin shim located around said expander and pressed outwardly thereby, horizontal upper and lower thin, circular, parted rails around said shim, a spacer between the rails around said shim, said shim at its outer side having upper and lower oppositely inclined continuous annular surfaces, located in planes at acute angles to the vertical plane of said shim, against which surfaces the inner edges of said rails bear.

2. A piston ring comprising, a parted, circular shim of thin generally rigid material, said shim having a width preselected for free reception of the shim axially in a preselected width of piston ring groove, expander means inside said shim acting thereon to tend to enlarge the shim, upper and lower, parted, horizontal thin rails around the upper and lower edge portions of said shim, means maintaining said rails in spaced relation to each other, said rails at their inner edges bearing against the outer side of said shim adjacent the upper and lower edge portions thereof, said shim at said upper and lower edge portions having annular upwardly and inwardly inclined and downwardly and inwardly inclined surfaces, respectively, against which the inner edges of said rails bear.

3. A piston ring having the elements in combination defined in claim 2, said rails bearing against portions of upper and lower sides of said rail separation means and detachably cemented thereto.

References Cited in the file of this patent

UNITED STATES PATENTS

| | | |
|---|---|---|
| 345,767 | Buckley | July 20, 1886 |
| 1,720,583 | Walsh | July 9, 1929 |
| 1,811,012 | Hodge | June 23, 1931 |
| 1,966,782 | Zeledon | July 17, 1934 |
| 2,323,815 | Landon | July 6, 1943 |
| 2,468,980 | Huber | May 3, 1949 |
| 2,695,825 | Estey | Nov. 30, 1954 |